Jan. 21, 1964     R. J. MESERVE     3,118,704
PORTABLE ARM REST FOR MOTOR VEHICLES
Filed June 19, 1963
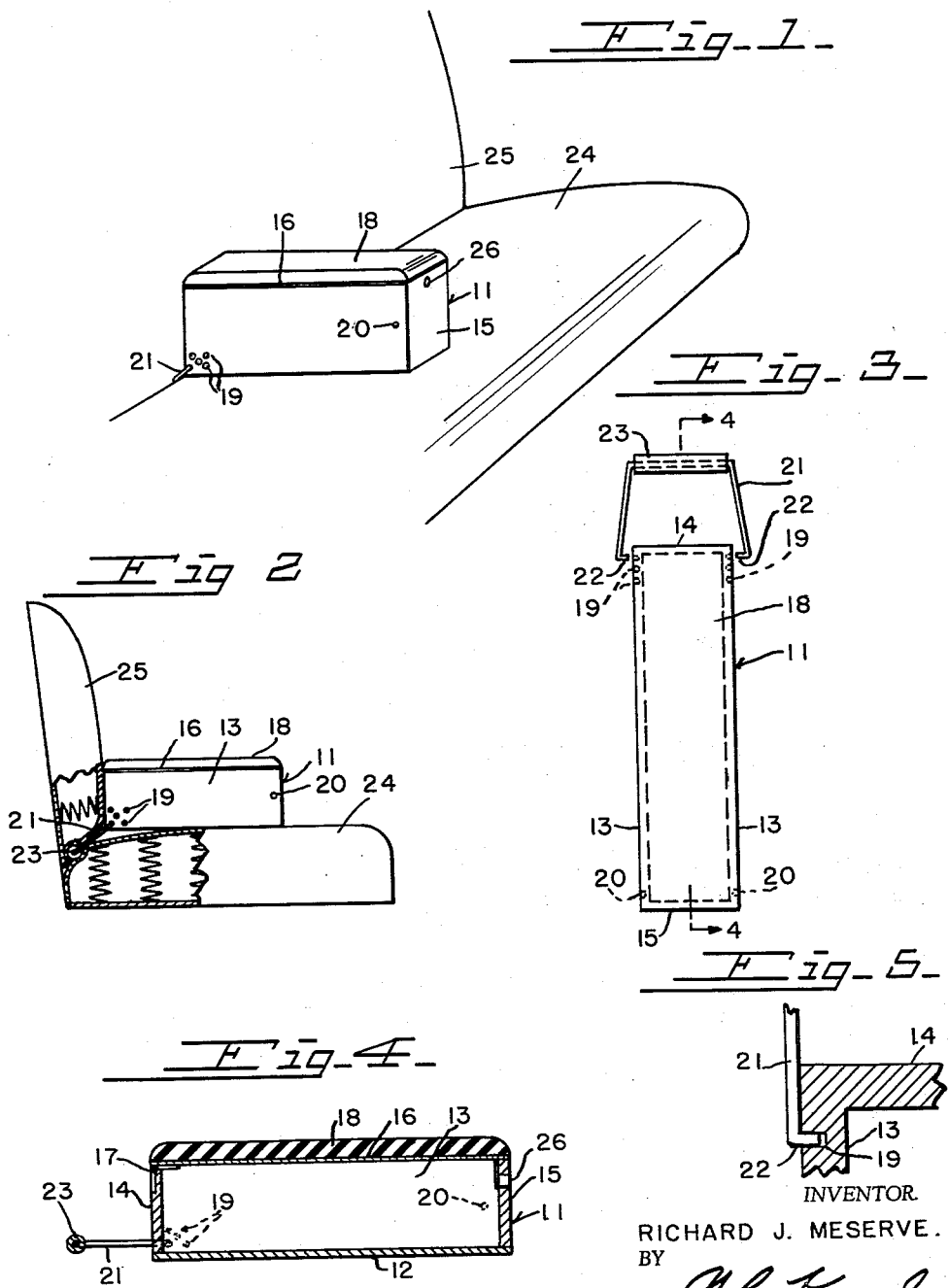
INVENTOR.
RICHARD J. MESERVE.
BY
ATTORNEY.

United States Patent Office 3,118,704
Patented Jan. 21, 1964

3,118,704
PORTABLE ARM REST FOR MOTOR VEHICLES
Richard J. Meserve, 10620 Deerfield Road,
Cincinnati 42, Ohio
Filed June 19, 1963, Ser. No. 289,107
1 Claim. (Cl. 297—194)

This invention relates to improvements in portable arm rests for motor vehicles incorporating a receptacle with a hinged lid for storing objects and which can be carried when not in place in the motor vehicle.

The object of my invention is to provide an arm rest which can be positioned in desired fixed relation to the person sitting in the motor vehicle either in the front or rear seat to provide a comfortable rest for the arm and to also provide a receptacle for articles.

A further object is to provide an adjustable extension having an enlarged cross-bar to anchor the arm rest between the seat and back rest.

A further object is to provide the adjustable extension with resilient means whereby the extension can be detached from the rear of the arm rest and attached to the forward portion of the arm rest to provide a handle for carrying the arm rest as a container removed from the motor vehicle.

My invention will be further readily understood from the following description and claims, and from the drawings, in which latter:

FIG. 1 is a fragmental perspective view of my improved arm rest in position on a motor vehicle seat.

FIG. 2 is a side view of the arm rest in relation to the seat, which is partly broken away.

FIG. 3 is an enlarged plan view of the arm rest, with the resilient member sprung to engage the box like structure.

FIG. 4 is a vertical section, taken in the plane of the line 4—4 of FIG. 3.

FIG. 5 is an enlarged section, showing the resilient member attached to the receptacle.

My improved device consists of a box like structure 11, having a bottom 12, side walls 13, a rear wall 14 and a front wall 15. A hinged cover 16 is hinged as at 17 to the rear wall 14. The cover 16 is padded as at 18 to form a comfortable arm rest. The lower rear corner of the side walls 13 are provided with a series of depressions 19 and a single depression 20 is adjacent to the central front edge of the side walls. A U-shaped resilient member 21 has inwardly extending ends 22 and an enlarged portion 23 on the base of the U member. The U-shaped member is resilient and can be sprung to permit the insertion of the ends 22 into the depressions 19, whereby the enlarged portion 23 can be inserted between the seat cushion 24 and the back rest 25 of either the front or back seat of a motor vehicle. The series of depressions permits adjustment of the resilient member to fit various seat structures and to securely hold the arm rest on the seat against the back rest. The enlarged portion 23 of the U-shaped member is wedged into place to hold the arm rest in fixed position.

If it is desired to use the arm rest as a carrying case, the resilient member is removed from the rear of the arm rest and the ends 22 are sprung into the depressions 20 and the U-shaped member becomes a carrying handle for the arm rest.

A suitable lock 26 may be provided to lock the cover to the boxlike structure.

From the foregoing it will be apparent that I have devised a simple inexpensive device for holding the arm rest in place and serving the double purpose of providing a carrying handle for the arm rest.

Having thus fully described my invention, what I claim as new and desire to secure by Letters Patent, is:

A portable arm rest for motor vehicles comprising:
(a) a boxlike structure having a bottom, side walls, front and rear walls,
(b) a padded cover hinged to said rear wall,
(c) depressions in the side walls adjacent the rear and bottom thereof,
(d) depressions in the central forward portion of the side walls, and
(e) a resilient U-shaped member having an enlarged central portion to either end of said boxlike structure to anchor said structure to the seat of a motor vehicle or to form a carrying handle.

References Cited in the file of this patent
UNITED STATES PATENTS

| | | |
|---|---|---|
| 2,160,282 | Rehg | May 30, 1939 |
| 2,726,710 | Cutler | Dec. 13, 1955 |
| 2,971,572 | Watkins | Feb. 14, 1961 |
| 3,080,205 | Hackley | Mar. 5, 1963 |

UNITED STATES PATENT OFFICE
CERTIFICATE OF CORRECTION

Patent No. 3,118,704                                                    January 21, 1964

Richard J. Meserve

It is hereby certified that error appears in the above numbered patent requiring correction and that the said Letters Patent should read as corrected below.

Column 2, line 36, after "portion" insert -- attachable --.

Signed and sealed this 16th day of June 1964.

(SEAL)
Attest:

ERNEST W. SWIDER                                           EDWARD J. BRENNER
Attesting Officer                                                Commissioner of Patents